United States Patent [19]
Nishigaki

[11] Patent Number: 5,998,937
[45] Date of Patent: Dec. 7, 1999

[54] LIGHT CONTROLLER CONNECTED TO PIEZOELECTRIC TRANSFORMER FOR CONTROLLING COLD CATHODE TUBE BY CHANGING FREQUENCY OR DUTY FACTOR DEPENDING UPON LUMINOUS INTENSITY

[75] Inventor: Eitaro Nishigaki, Tokyo, Japan

[73] Assignee: NEC Corporation, Tokyo, Japan

[21] Appl. No.: 09/023,783

[22] Filed: Feb. 13, 1998

[30] Foreign Application Priority Data

Feb. 13, 1997 [JP] Japan .................................. 9-044729

[51] Int. Cl.⁶ .................................................. H05B 37/02
[52] U.S. Cl. .................................. 315/209 PZ; 315/224; 315/307
[58] Field of Search ........................... 315/224, 209 R, 315/209 PZ, 307, 291, 219, 308; 310/316, 318

[56] References Cited

U.S. PATENT DOCUMENTS 5,371,439  12/1994  Griffin ....................................... 315/308
5,486,740  1/1996  Yamashita et al. ...................... 315/307
5,796,213  8/1998  Kawasaki ................................. 315/307
5,854,543  12/1998  Satoh et al. .............................. 315/291

FOREIGN PATENT DOCUMENTS 8-107678  4/1996  Japan .
8-94996   4/1996  Japan .
8-149850  6/1996  Japan .

Primary Examiner—Don Wong
Assistant Examiner—Wilson Lee
Attorney, Agent, or Firm—Sughrue, Mion, Zinn, Macpeak & Seas, PLLC

[57] ABSTRACT

A piezoelectric transformer drives a cold cathode tube under the control of a light controller; when the cold cathode tube is radiating in a small luminous intensity range, the light controller changes the duty factor of a driving signal supplied to the piezoelectric transformer so as to adjust the cold cathode tube at a target luminous intensity, and prevents the cold cathode tube from undesirable luminous gradient; when the cold cathode tube is radiating in a large luminous intensity range, the light controller changes the frequency of the driving signal so as to adjust the cold cathode tube to a target luminous intensity, and prevents a power supply unit from undesirable frequent load variation.

16 Claims, 12 Drawing Sheets

Fig. 9

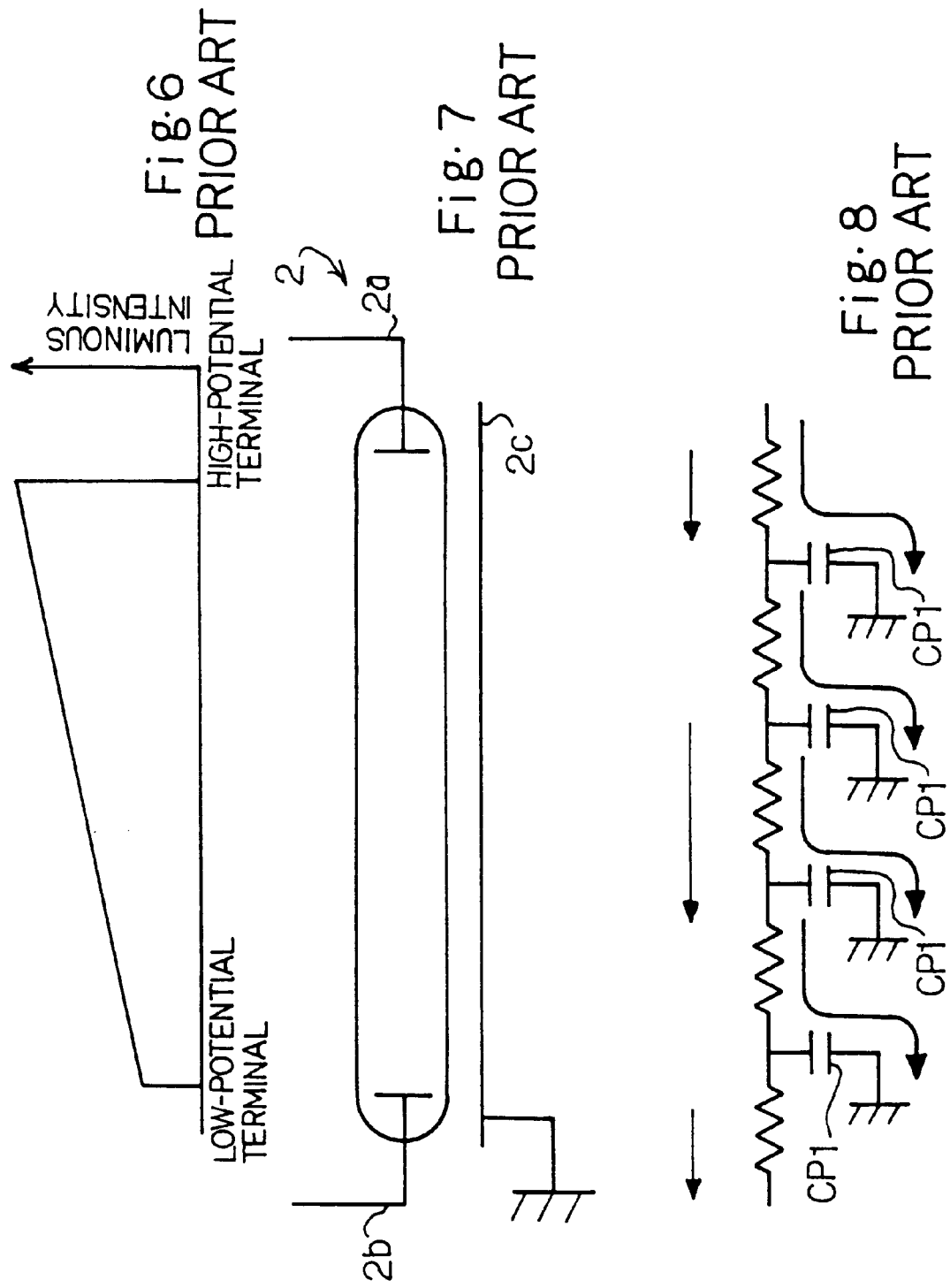

to change the duty factor of the driving signal DR.

LIGHT CONTROLLER CONNECTED TO PIEZOELECTRIC TRANSFORMER FOR CONTROLLING COLD CATHODE TUBE BY CHANGING FREQUENCY OR DUTY FACTOR DEPENDING UPON LUMINOUS INTENSITY

FIELD OF THE INVENTION

This invention relates to a light controller for a piezoelectric transformer and, more particularly, to a light controller for a piezoelectric transformer associated with cold cathode tube.

DESCRIPTION OF THE RELATED ART

A piezoelectric transformer serves as an inverter for controlling the cold cathode tube, and the prior art controlling methods for the piezoelectric transformer are broken down into two groups. A controlling technology categorized in the first group varies the frequency of a driving signal supplied to the piezoelectric transformer so as to change the step-up ratio and, accordingly, the amount of load current flowing through the cold cathode tube for controlling the luminous intensity of the cold cathode tube, and is hereinbelow referred to as "variable frequency light controlling technology". On the other hand, a controlling technology categorized in the second group changes the duty factor of the driving signals, and is hereinbelow referred to as "variable duty-factor light controlling technology".

A typical example of the variable duty-factor light controller is disclosed in Japanese Patent Publication of Unexamined Application No. 8-14950. The prior art variable duty-factor light controller disclosed in the Japanese Patent Publication of Unexamined Application is arranged as follows. A phase comparator is connected to a primary electrode and a secondary electrode of a piezoelectric transformer, and the phase comparator compares an input driving signal with an output signal for producing a phase detecting signal representative of a phase difference between the input driving signal and the output signal. The phase detecting signal is supplied to a frequency controller, which produces a frequency control signal representative of the phase difference to be eliminated. The frequency control signal is supplied to a voltage-controlled oscillator. The voltage-controlled oscillator is responsive to the frequency control signal so as to vary an output oscillating signal. The output oscillating signal is supplied to a driving circuit, and the driving circuit changes the input driving signal in such a manner as to minimize the phase difference. The output signal is supplied to a cold-cathode tube, and the cold-cathode tube radiates light.

Japanese Patent Publication of Unexamined Application No. 8-107678 discloses a variable frequency light controller and a variable duty-factor light controller. FIG. 1 illustrates the prior art variable frequency light controller 1 disclosed in Japanese Patent Publication of Unexamined Application No. 8-107678. The prior art variable frequency light controller 1 is associated with a cold cathode tube 2 driven for radiating light by a piezoelectric transformer 3. The piezoelectric transformer 3 has a pair of primary electrodes 3a/3b. The prior art variable frequency light controller 1 is connected to the primary electrodes 3a/3b of the piezoelectric transformer 3, and supplies a driving signal DR thereto. The piezoelectric transformer 3 amplifies the driving signal DR, and supplies a boosted driving signal BDR from the secondary electrode 3c to a high-potential terminal 2a of the cold cathode tube 2. The cold cathode tube 2 generates light, and load current CR flows out from a low-potential terminal 2b. The low-potential terminal 2b is connected to the prior art variable frequency light controller 1.

The prior art variable frequency light controller 1 comprises a comparator 1a, a sweep oscillator 1b and a driving circuit 1c. The comparator 1a has two input nodes, one of which is connected to the low-potential terminal 2b and the other of which is supplied with a reference voltage VrefA. The comparator 1a converts the load current CR to corresponding voltage, and compares the voltage with the reference voltage VrefA. When the voltage is deviated from the reference voltage VrefA, the comparator 1a supplies a control signal representative to a sweeping direction to the sweep oscillator 1b. The comparator 1a determines the sweeping direction in such a manner as to decrease the difference between the voltage and the reference voltage VrefA.

The sweep oscillator 1b is responsive to the control signal CTL1 so as to vary the frequency of an oscillating signal OSC1 in the sweeping direction. The oscillating signal OSC1 is supplied to the driving circuit 1c, and the driving circuit 1c appropriately shapes the oscillating signal OSC1 into the driving signal DR. Thus, the prior art light controller 1, the piezoelectric transformer 3 and the cold cathode tube 2 form a control loop. The piezoelectric transformer 3 peaks the step-up ratio at the resonant frequency, and the prior art variable frequency light controller 1 makes the load current CR1 constant through the control loop.

When reference voltage VrefA is changed, the sweep oscillator 1b changes the frequency of the oscillating signal OSC1, and, accordingly, the driving circuit 1c changes the frequency of the driving signal DR. The oscillating conditions of the piezoelectric transformer 3 are changed, and the load current CR1 is varied. In this way, the prior art variable frequency light controller 1 varies the luminous intensity of the cold cathode tube.

The prior art variable duty-factor light controller 4 disclosed in Japanese Patent Publication of Unexamined Application is shown in FIG. 2. The prior art variable duty-factor light controller 4 comprises a comparator 4a, a sweep oscillator 4b, a duty factor controller 4c and a driving circuit 4d. The prior art variable duty-factor light controller 4 is also associated with the cold cathode tube 2 driven by the piezoelectric transformer 3. The comparator 4a behaves as similar to the comparator 1a. The duty factor controller 4c is responsive to a control voltage DTYA representative of a duty factor of an enable signal EBL1 so as to change the enable signal EBL1 between active level and inactive level. The frequency of the enable signal is less than 1/100 of the frequency of the driving signal DR. The duty factor for controller 4c supplies the enable signal to the sweep oscillator 4b.

The enable signal EBL1 of the active level makes the sweep oscillator 4b to vary the frequency of oscillating signal OSC1 in the sweeping direction. However, when the duty factor controller 4c changes the enable signal EBL1 to the inactive level, the sweep oscillator 4b stops the sweeping operation, and maintains the frequency of the oscillating signal OSC1.

When the enable signal EBL1 of the active level is supplied to the driving circuit 4d, the driving circuit 4d enables the oscillating signal OSC1 into the driving signal DR, and supplies the driving signal DR to the primary electrodes 3a/3b of the piezoelectric transformer 3. The enable signal EBL1 of the inactive level causes the driving circuit 4d to stop the driving signal DR, and, accordingly, the piezoelectric transformer 3 does not supply the boosted driving signal BDR to the cold cathode tube 2. Thus, the duty factor controller 4c modulates the ratio of active time period to unit time, i.e., the duty factor of the driving signal DR depending upon the control voltage DTYA, and the cold cathode tube 2 varies the luminous intensity.

The cold cathode tube 2 is used as a back light source incorporated in a liquid crystal display panel, and the piezoelectric transformer 3 serves as an inverter for the cold cathode tube 2. In this application, the luminous intensity is controlled by the prior art variable frequency light controller 1 or the prior art variable duty-factor light controller 4. However, the prior art variable frequency light controller 1 and the prior art variable duty-factor light controller 4 encounter the following problems.

The first problem inherent in the prior art variable frequency light controller 1 is abrupt change of the luminous intensity when the tube current is decreased. This phenomenon is derived from mismatching between the impedance of the cold cathode tube 2 and the impedance of the piezoelectric transformer 3. When the impedance mismatching takes place, the tube current undesirably oscillates, and the effective tube current is seriously decreased. In detail, the piezoelectric transformer 3 varies the step-up ratio depending upon the driving frequency as indicated by plots shown in FIG. 3. When a load such as the cold cathode tube 2 is coupled to the piezoelectric transformer 3 increases the impedance as indicated by arrow AR1, the plots are changed. On the other hand, the cold cathode tube 2 changes the current as indicated by plots in FIG. 4. The cold cathode tube 2 is assumed to operate at point B. When the reference voltage VrefA is changed, the cold cathode tube 2 changes the operating point from B to C, the cold cathode tube 2 becomes unstable due to the negative impedance characteristics. The impedance of the cold cathode tube 2 is increased during the movement from point B to point C as indicated by arrow b1, and the increased impedance changes the plots as indicated by arrow a1 (see FIG. 3). The piezoelectric transformer 3 applies large potential to the cold cathode tube 2, and the cold cathode tube 2 increases the current. This means that the operating point is moved as indicated by arrow b2, and the cold cathode tube 2 decreases the impedance. As a result, the plots are moved in the direction of arrow a2. The piezoelectric transformer 3 has a steep Q characteristics, and consumes long time until the mechanical vibrations reaches a target frequency. For this reason, the piezoelectric transformer 3 reciprocates the step-up ratio as indicated by arrows a1 and a2, and, accordingly, the cold cathode tube 2 periodically varies the current along arrows b1 and b2. FIG. 5A illustrates the waveform of the load current CR1 without the oscillation. When the oscillation takes place, the load current CR1 is periodically varied as shown in FIG. 5B. As a result, the cold cathode tube 2 abruptly decreases the luminous intensity.

The second problem inherent in the prior art variable frequency light controller is "luminous gradient". The luminous gradient is the phenomenon where the luminous intensity is different between both ends of the cold cathode tube 2 shown in FIG. 6. The luminous gradient is derived from the structure of the cold cathode tube 2. As shown in FIG. 7, the cold cathode tube 2 has a reflector 2c extending between the high-potential end and the low-potential end, and parasitic capacitors CP1 are coupled to the current path between the high-potential end and the low-potential end as shown in FIG. 8. The parasitic capacitors CP1 make the tube current gradient, and, accordingly, the luminous gradient takes place along the current path in the tube.

On the other hand, the first problem inherent in the prior art variable duty-factor light controller 4 is large variation of driving load. The driving circuit 4d intermittently supplies the driving signal DR to the piezoelectric transformer 3 under the control of the duty factor controller 4c, and a power unit (not shown) is expected to withstand the high-speed variation of load. However, it is difficult to design the power unit.

The second problem inherent in the prior art variable duty-factor light controller 4 is audible noise. When the control voltage DTYA is changed for varying the luminous intensity, the driving frequency of the piezoelectric transformer 3 is modulated, and the audible noise takes place. The more the tube current is, the larger the audible noise is.

SUMMARY OF THE INVENTION

It is therefore an important object of the present invention to provide a light controller which is free from the abrupt change of luminous intensity, the luminous gradient, difficulty of design work for a power unit and the audible noise.

The present inventor contemplated the problems, and noticed that the problems inherent in the variable frequency light controller 1 and the problems inherent in the variable duty-factor light controller 4 were serious in different luminous intensity ranges or different ranges of tube current. While the cold cathode tube is radiating light at large luminous us intensity, the variation of load was serious, and damaged the power unit. However, the luminous gradient is ignorable at the large luminous intensity. On the other hand, even though the load was frequently varied, the power unit was easily respond to the variation of load at small luminous intensity. However, the luminous gradient was serious. The other problems were also weighted depending upon the luminous intensity or the tube current. The present inventor concluded the piezoelectric transformer should be controlled by an appropriate light control technology depending upon the luminous intensity.

To accomplish the object, the present invention proposes to change the light control technology depending upon the luminous intensity.

In accordance with one aspect of the present invention, there is provided a light controller connected to a piezoelectric transformer for controlling a light source, and the controller comprises an instruction means for producing a first control signal representative of a target luminous intensity of the light source, a first light intensity controlling means supplying a variable frequency driving signal to the piezoelectric transformer for adjusting the light source to the target luminous intensity, a second light intensity controlling means supplying a variable duty factor driving signal to the piezoelectric transformer for adjusting the light source to the target luminous intensity and a change-over means responsive to the first control signal for selectively activating the first light intensity controlling means and the second light intensity controlling means.

BRIEF DESCRIPTION OF THE DRAWINGS

The features and advantages of the light controller will be more clearly understood from the following description taken in conjunction with the accompanying drawings in which:

FIG. 6 is a view showing the luminous gradient in the cold cathode tube;

FIG. 7 is a schematic view showing the cold cathode tube;

FIG. 8 is a circuit diagram showing the equivalent circuit of the cold cathode tube;

DESCRIPTION OF THE PREFERRED EMBODIMENTS

First Embodiment

Figure 9:
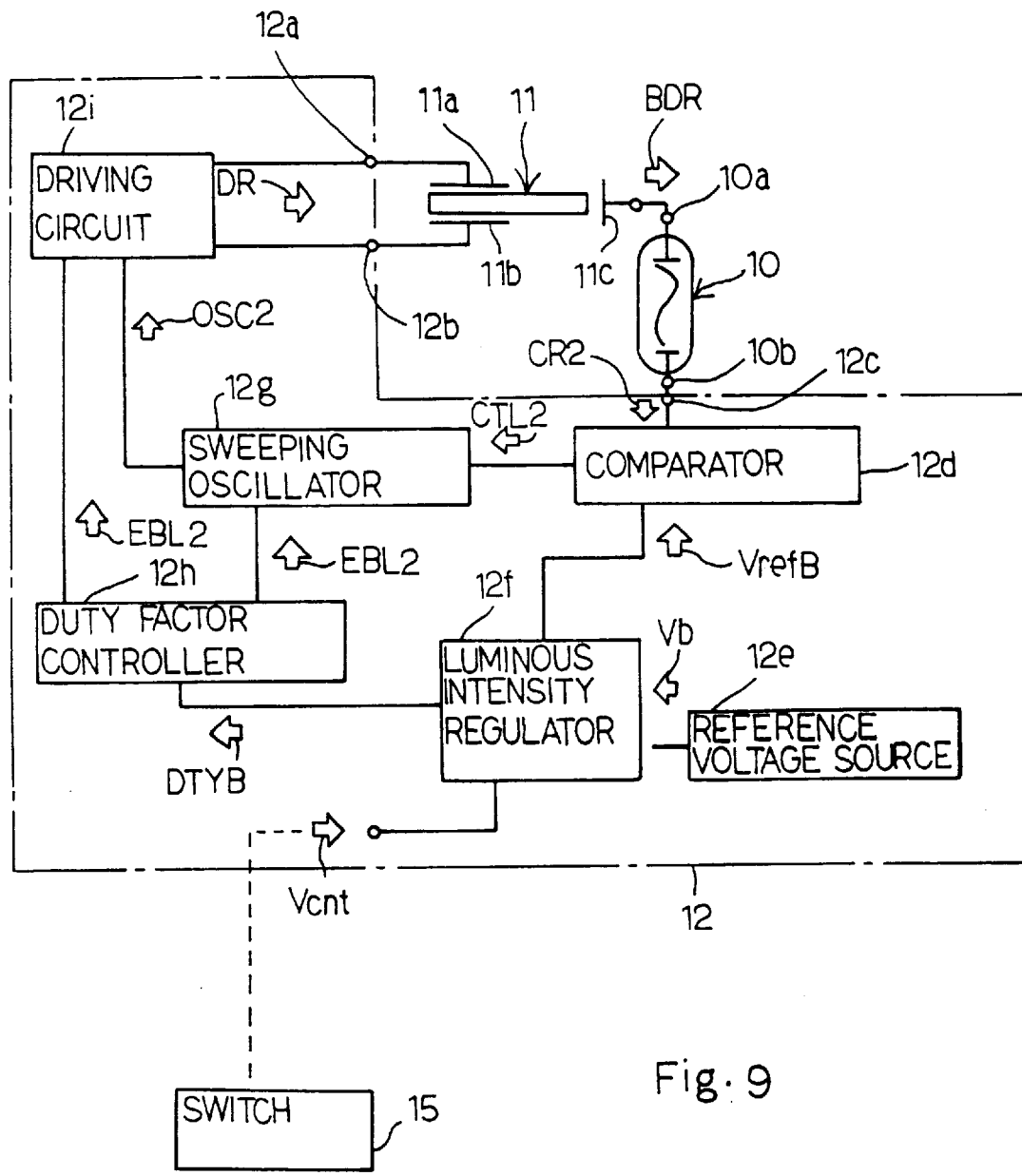
FIG. 9 is a block diagram showing the circuit configuration of a light controller according to the present invention.

Referring to FIG. 9 of the drawings, a cold cathode 10 is driven for radiating light by a piezoelectric transformer 11 under the control of a light controller 12 embodying the present invention. The piezoelectric transformer 11 has a pair of primary electrodes 11a/11b and a secondary electrode 11c, the former of which is connected to a pair of signal output nodes 12a/12b of the light controller, and the other of which is connected to a high-potential terminal 10a of the cold cathode tube 10. A low-potential terminal 10b of the cold cathode tube 10 is connected to a control node 12c of the light controller 12, and load current CR2 flows out through the low-potential terminal 10b. The cold cathode tube 10 is similar in structure to the cold cathode tube 2, and also has a reflector (not shown).

The light controller 12 supplies a driving signal DR from the pair of signal output nodes 12a/12b to the primary electrodes 11a/11b, and the piezoelectric transformer 11 amplifies the driving signal DR so as to supply a boosted driving signal BDR to the cold cathode tube 10. Tube current flows through the cold cathode tube 10, and causes the cold cathode tube 10 to radiate light. The light controller 12 is a compromise between the variable frequency light controlling technology and the variable duty-factor light controlling technology, and controls the load current CR2 through variation in the frequency of the driving signal DR or variation in the duty-factor of the driving signal DR. When the light controller 12 controls the luminous intensity through the variation in frequency, the control mode is referred to as "variable frequency control mode". On the other hand, when the light controller 12 controls the luminous intensity through the variation in duty-factor, the control mode is referred to as "variable duty-factor control mode". The light controller changes the control mode between the variable frequency control mode and the variable duty-factor control mode depending upon the luminous intensity to be adjusted.

The light controller 12 comprises a comparator 12d, a reference voltage source 12e, a luminous intensity regulator 12f, a sweep oscillator 12g, a duty factor controller 12h and a driving circuit 12i.

The comparator 12d has two input nodes, one of which is connected to the control node 12c, and the other of which is connected to the luminous intensity regulator 12f. The luminous intensity regulator 12f supplies a control voltage VrefB to the comparator 12d in the variable frequency control mode. The load current CR2 is converted to corresponding voltage level, and the control voltage VrefB is representative of a target load current or a target frequency. As described hereinbelow, the luminous intensity of the cold cathode tube 10 is increased together with the control voltage VrefB. The comparator 12d compares the voltage corresponding to the load current CR2 with the control voltage VrefB, and supplies a control signal CTL2 representative of a sweeping direction to the sweep oscillator 12g.

The sweep oscillator 12g generates an oscillating signal OSC2, and is responsive to the control signal STL2 for varying the frequency of the oscillating signal OSC2 in the sweeping direction. When the voltage corresponding to the load current CR2 is matched with the control voltage VrefB, the comparator 12d does not instruct any sweeping direction to the sweep oscillator 12g, and the sweep oscillator 12g fixes the oscillating signal OSC2 to the target frequency. The oscillating signal OSC2 is supplied from the sweep oscillator 12g to the driving circuit 12i. The driving circuit 12i amplifies and shapes the oscillating signal OSC2 into the driving signal DR appropriate to the piezoelectric transformer 11. When the control voltage VrefB is changed, the sweep oscillator 12g changes the oscillating signal OSC2 to a new target frequency, and, accordingly, the driving signal 12i changes the frequency of the driving signal DR. The piezoelectric transformer 11 varies the step-up ratio and, accordingly, the amplitude of the boosted driving signal BDR depending upon the frequency of the driving signal DR and the frequency of the oscillating signal OSC2. For this reason, the amount of load current CR2 is varied with the driving signal DR, and the load current CR2 is controlled to the target load current. The cold cathode tube 10 changes the luminous intensity together with the amount of load current CR2. Thus, the comparator 12d, the sweep oscillator 12g and the driving circuit 12i as a whole constitute a first light intensity controlling means.

The duty factor controller 12h is connected to the luminous intensity regulator 12f, and the luminous intensity regulator 12f supplies a control voltage DTYB to the duty factor controller 12h in the variable duty-factor control mode. The control voltage DTYB is representative of a target duty factor of the driving signal DR, and the luminous intensity of the cold cathode tube 10 is increased together with the control voltage DTYB. The duty factor controller 12h changes an enable signal EBL2 between an active level and an inactive level in such a manner as to achieve the target duty factor. The frequency of the enable signal EBL2 is so low that a person does not feel the cold cathode tube 10 flickering. The enable signal EBL2 is supplied to the sweep oscillator 12g and the driving circuit 12i.

The sweep oscillator 12g is enabled with the enable signal EBL2 of the active level, and changes the frequency of the oscillating signal OSC2 in the sweeping direction as described hereinbefore. When the enable signal EBL2 is changed to the inactive level, the sweep oscillator 112g fixed the oscillating signal OSC2 to a certain frequency. The driving circuit 12i is also enabled with the enable signal EBL2 of the active level, and amplifies and shapes the oscillating signal. When the enable signals EBL2 is changed to the inactive level, the driving circuit 12i stops the driving signal DR. Thus, the driving circuit 12i intermittently supplies the driving signal DR to the piezoelectric transformer 11 in the variable duty-factor control mode, and controls the average load current CR2.

In this way, the duty factor controller 12h controls the average load current CR2, and, accordingly, the luminous intensity with the enable signal EBL2. The comparator 12d, the sweep oscillator 12g, the duty factor controller 12h and the driving circuit 12i and a whole constitute a second light intensity controlling means.

The luminous intensity regulator 12f is responsive to a control voltage Vcnt representative of a target luminous intensity so as to change the control voltage VrefB or the control voltage DTYB. In other words, the luminous intensity regulator 12f changes or maintains the luminous intensity of the cold cathode tube 10 through the control voltage DTYB or the control voltage VrefB. The reference voltage source 12e is connected to the luminous intensity regulator 12f, and supplies a boundary voltage Vb representative of the boundary luminous intensity between the variable frequency control mode and the variable duty-factor control mode to the luminous intensity regulator 12f. The boundary voltage Vb is representative of the minimum luminous intensity at which the tube current does not oscillate and the luminous gradient is not serious. The luminous intensity equal to or greater than the minimum luminous intensity of hereinbelow referred to as "variable frequency control range", and the luminous intensity less than the minimum luminous intensity is hereinbelow referred to as "variable duty-factor control range".

When the target luminous intensity is equal to or greater than the boundary, the light controller 12 controls the luminous intensity in the variable frequency control mode, and the luminous intensity regulator 12f changes the reference voltage VrefB to the target frequency corresponding to the target luminous intensity. On the other hand, when the target luminous intensity is less than the boundary, the light controller 12 controls the luminous intensity in the variable duty-factor control mode, and the luminous intensity regulator 12f changes the control voltage DTYB. In this way, the luminous intensity regulator 12f cooperates with the reference voltage generator 12e for selecting the control mode, and the luminous intensity regulator 12f and the reference voltage generator 12e as a whole constitute a change-over means.

Figure 10:
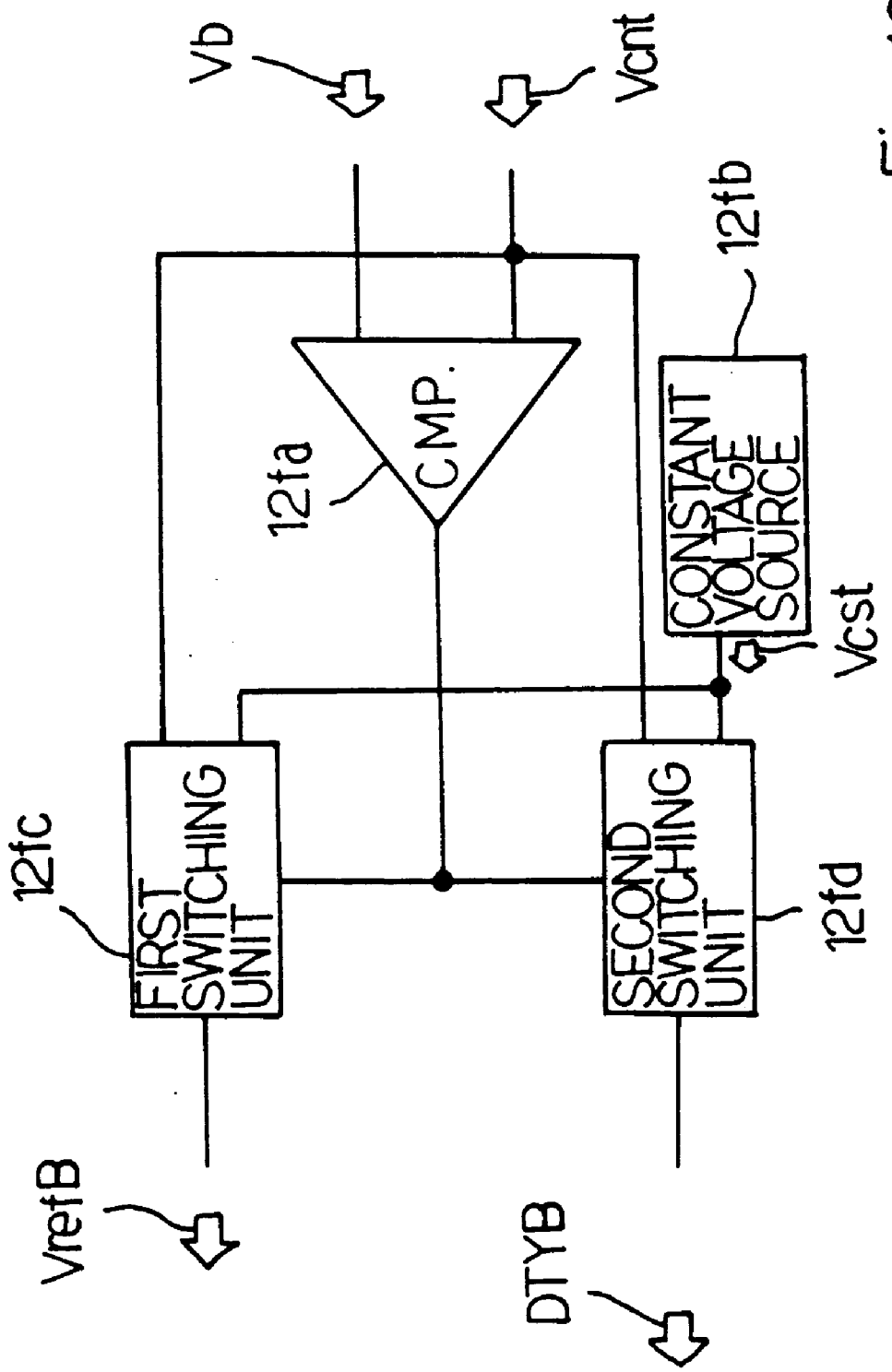
FIG. 10 is a block diagram showing the circuit configuration of a luminous intensity regulator incorporated in the light controller.

Turning to FIG. 10 of the drawings, the luminous intensity generator 12f includes a comparator 12fa, a constant voltage source 12fb, a first switching unit 12fc and a second switching unit 12fd. As described hereinbefore, the luminous intensity of the cold cathode tube 10 is increased together with the control voltage VrefB or DTYB, and the boundary voltage Vb is representative of the minimum luminous intensity without the oscillation of the tube current and the serious luminous gradient. The constant voltage source 12fb generates a constant voltage Vcst at all times. The control voltage Vcnt is, by way of example, supplied from a switch 15, which serves as an instruction means.

The control voltage Vcnt is supplied to the first input node of the first switching unit 12fc and the first input node of the second switching unit 12fd, and the constant voltage source 12fb is connected to the second input node of the first switching unit 12fc and the second input node of the second switching unit 12fd. The control voltage Vcnt and the boundary voltage Vb are supplied to the comparator 12fa, and the output node of the comparator 12fa is connected to the control node of the first switching unit 12fc and the control node of the second switching unit 12fd.

The comparator 12fa compares the control voltage Vcnt representative of the target luminous intensity with the boundary voltage Vb representative of the minimum luminous intensity to see whether user wants to change the luminous intensity in or to the variable frequency control range or the variable duty-factor control range. If the user wants to change the luminous intensity within or into the variable frequency control range, the comparator 12fa instructs the first switching unit 12fc to transfer the control voltage Vcnt to the comparator 12d as the control voltage VrefB, and the second switching unit 12fd transfers the constant voltage Vcst to the duty factor controller 12h as the control voltage DTYB. The comparator 12d and the sweep oscillator 12g changes the oscillating signal OSC2 to a new target frequency represented by the control voltage VrefB, and the cold cathode tube 10 is regulated to the target luminous intensity. On the other hand, the duty factor controller 12h does not respond to the control voltage DTYB, and keeps the enable signal EBL2 at the active level. In this way, the light controller 12 behaves in the variable frequency control mode.

When the user changes the luminous intensity under the minimum luminous intensity, the comparator 12fa instructs the second switching unit 12fd to transfer the control voltage Vcnt to the duty factor controller 12h as the control voltage DTYB, and the first switching unit 12fc transfers the constant voltage Vcst to the comparator 12d as the control voltage VrefB. Then, the light controller 12 changes the control mode to the variable duty-factor control mode, and the duty factor controller 12h periodically changes the enable signal EBL2 between the active level and the inactive level so as to control the average load current. The comparator 12d does not respond to the control voltage Vcnt, because the constant control voltage Vcst is supplied thereto.

Figure 11:
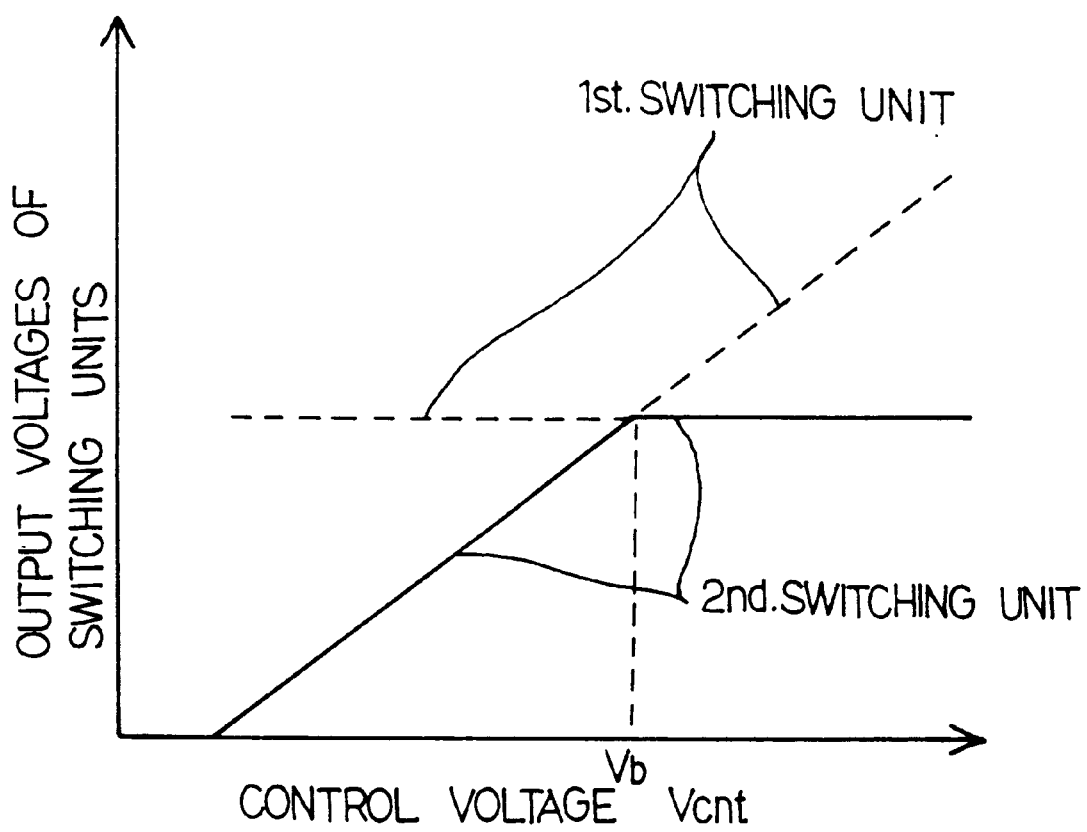
FIG. 11 is a diagram showing the output voltages of switching units in terms of a control voltage.

FIG. 11 illustrates the output voltage of the first switching unit 12fc and the output voltage of the second switching unit 12fd. While the control voltage Vcnt is being increased beyond the boundary voltage Vb, the output voltage of the first switching unit 12fc is varied as indicated by broken line, and the output voltage of the second switching unit 12fd is varied as indicated by real line. The output voltages are reversible.

As will be appreciated from the foregoing description, the light controller 12 controls the cold cathode tube 10 by changing the frequency of the driving signal DR over the minimum luminous intensity or the low impedance region of the cold cathode tube 10, and the power supply unit continuously supplies the electric power to the driving circuit 12i. For this reason, the power supply unit is less damaged. On the other hand, when the luminous intensity is less than the minimum luminous intensity, the light controller 12 controls the cold cathode tube 10 by changing the duty factor of the driving signal, and the cold cathode tube 10 is free from the serious luminous gradient and the abrupt change of luminous intensity due to the oscillation of the tube current.

Moreover, even is audible noise takes place, the load current is small, and the audible noise is ignoreable.

Second Embodiment

Figure 12:
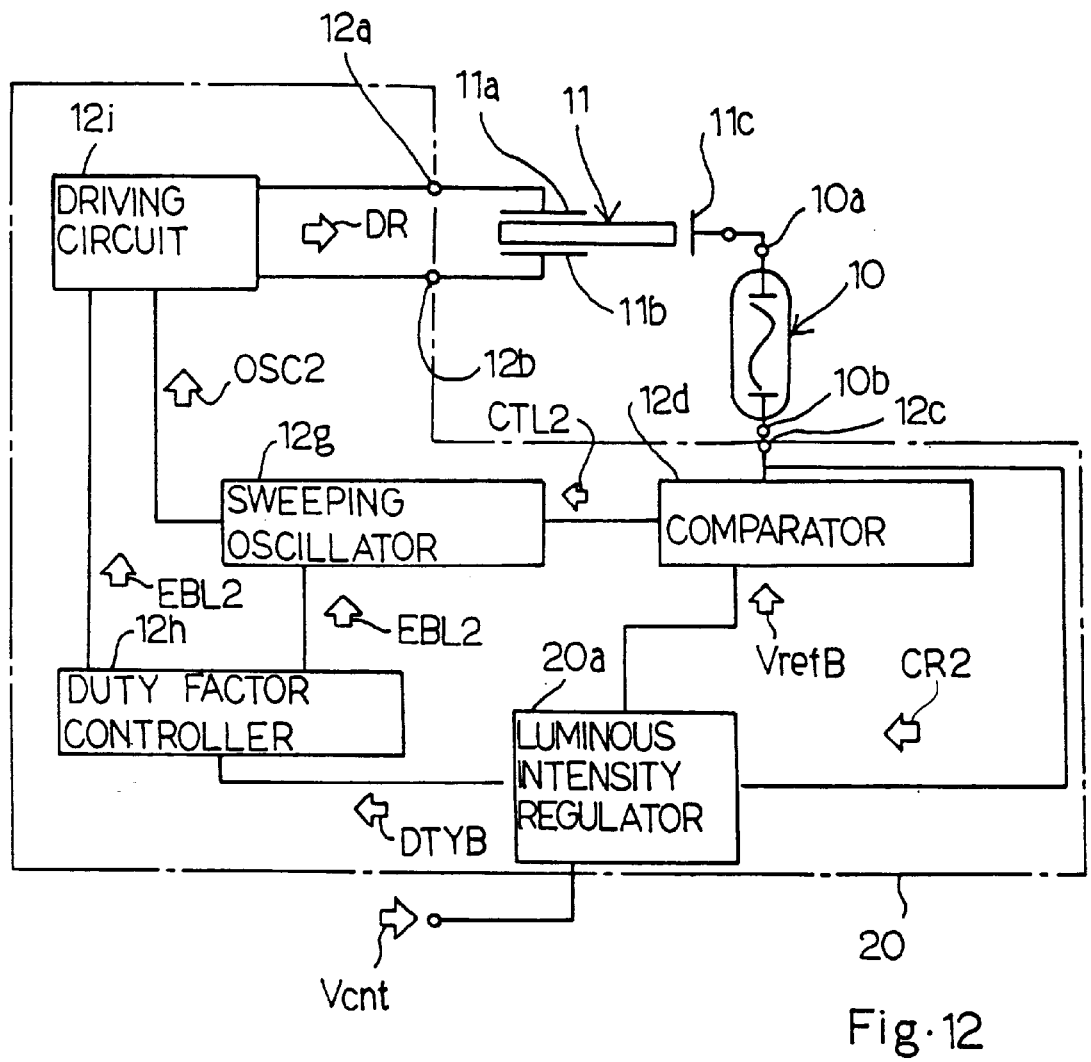
FIG. 12 is a block diagram showing the circuit configuration of another light controller according to the present invention.

Turning now to FIG. 12 of the drawings, the cold cathode tube 10 is controlled by another light controller 20 embodying the present invention. The light controller 20 is similar to the light controller 12 except for a luminous intensity regulator 20a. For this reason, the other components are labeled with the same references designating corresponding components of the light controller 12 without detailed description, and description is focused on the luminous intensity regulator 20a.

Figure 13:
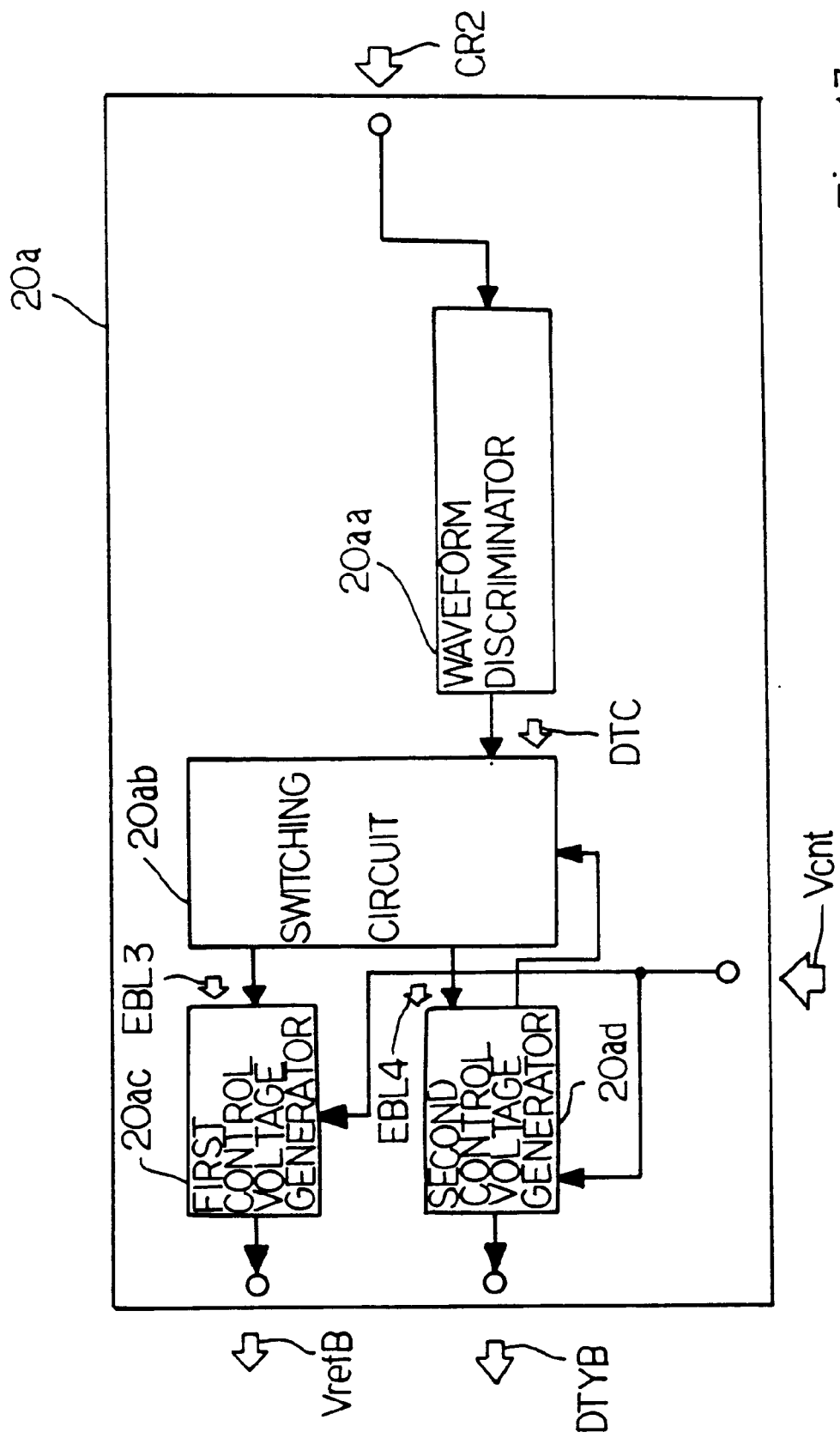
FIG. 13 is a block diagram showing the circuit configuration of a luminous intensity regulator incorporated in the light controller shown in FIG. 12.

The load current CR2 is supplied to not only the comparator 12d but also the luminous intensity regulator 20a. As shown in FIG. 13, the luminous intensity regulator 20a includes a waveform discriminator 20aa, a switching circuit 20ab, a first control voltage generator 20ac and a second control voltage generator 20ad.

Figure 1:
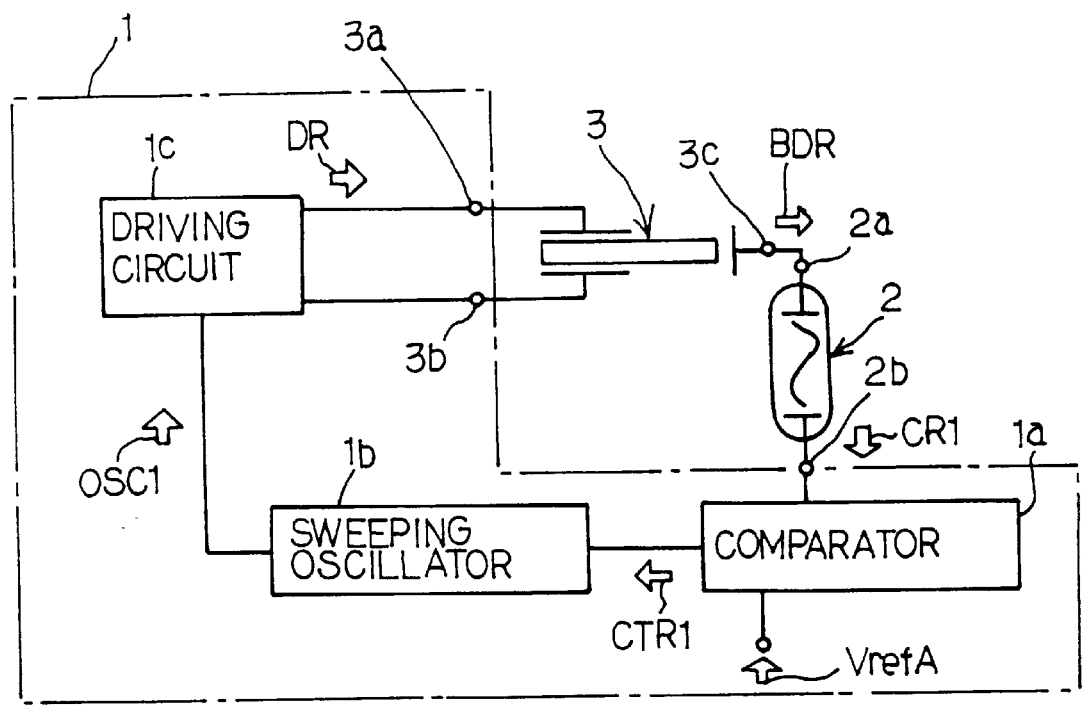
FIG. 1 is a block diagram showing the circuit configuration of the prior art variable frequency light controller.
Figure 2:
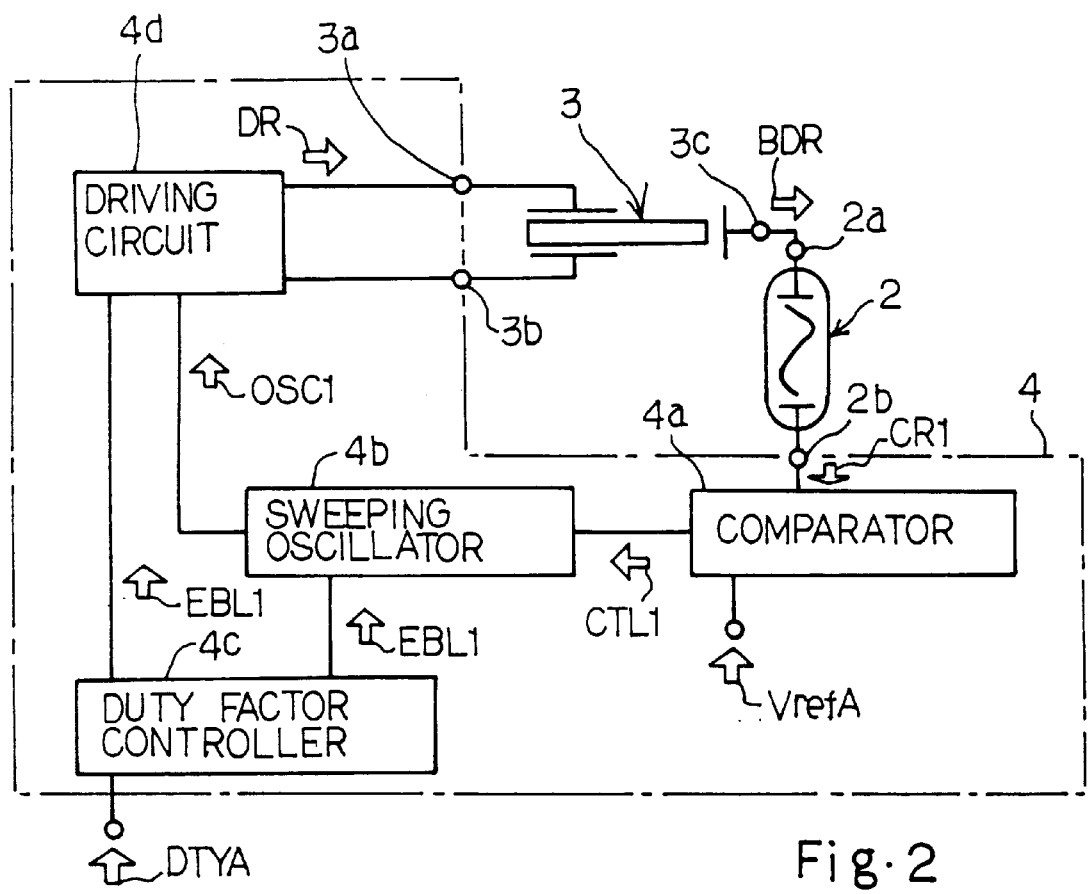
FIG. 2 is a block diagram showing the circuit configuration of the prior art variable duty-factor light controller.
Figure 3:
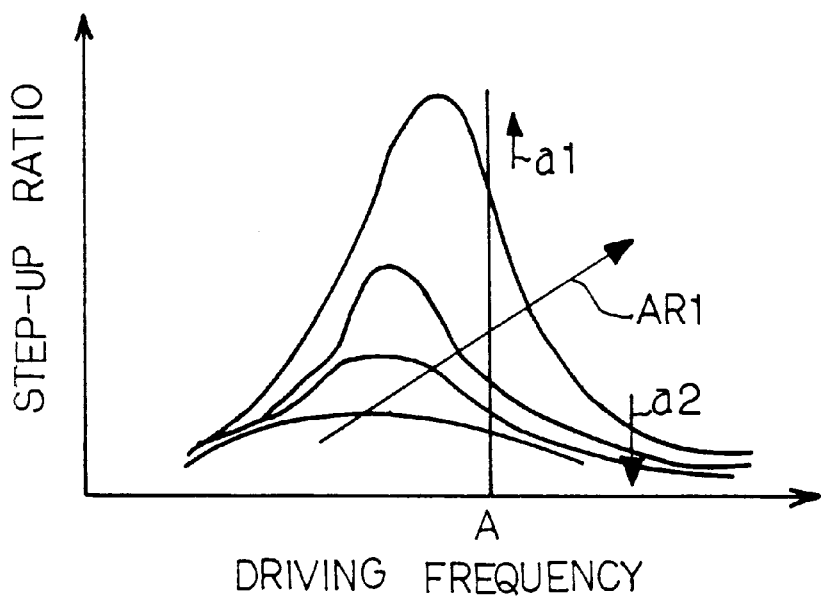
FIG. 3 is a graph showing the relation between the step-up ratio and the frequency of the piezoelectric transformer.
Figure 4:
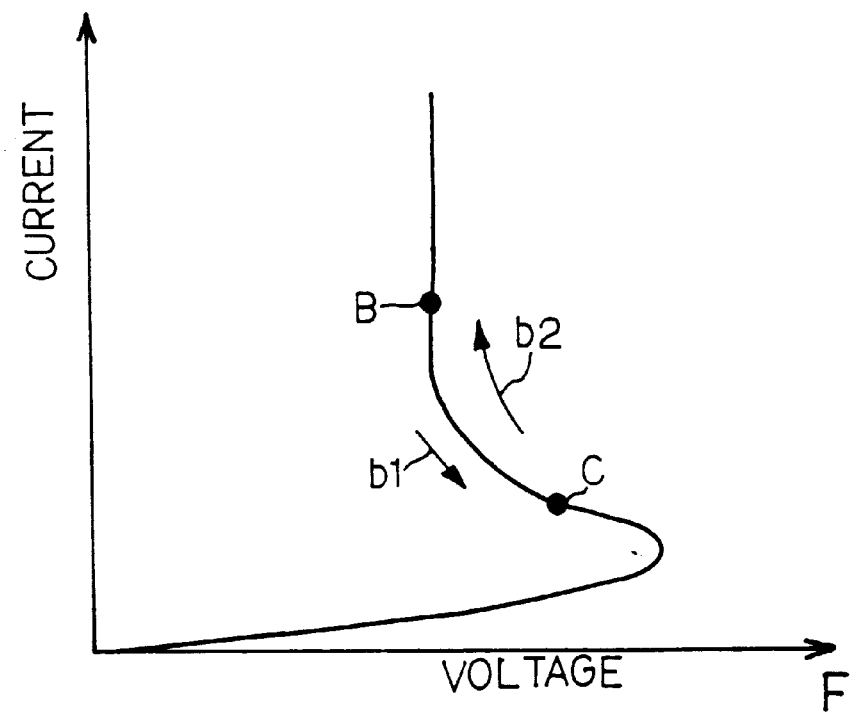
FIG. 4 is a graph showing the voltage-to-current characteristics of the cold cathode tube.
Figure 5A:
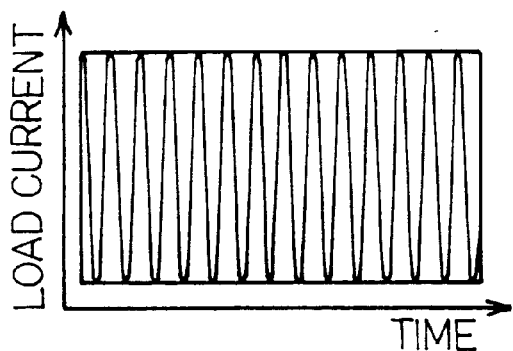
FIG. 5A is a view showing the waveform of the load current without the oscillation.
Figure 5B:
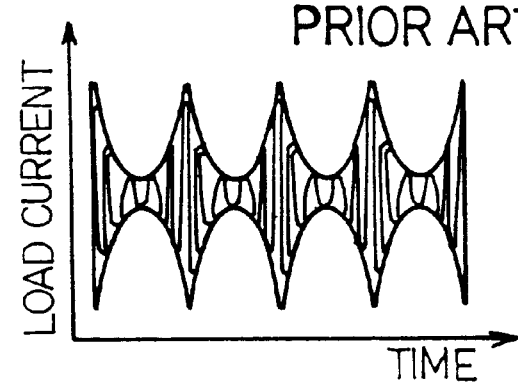
FIG. 5B is a view showing the waveform of the load current under the oscillation.

The waveform discriminator 20aa monitors the load current CR2 to see whether or not the waveform is indicative of the oscillation shown in FIG. 5B. When the load current CR2 has the waveform shown in FIG. 5A, the waveform discriminator 20aa maintains a detecting signal DTC at low level. If the waveform discriminator 20aa detects the oscillation, the waveform discriminator 20aa changes the detecting signal DTC to high level. The detecting signal DTC is supplied to the switching circuit 20ab.

The switching circuit 20ab is responsive to the detecting signal so as to selectively activate the first control voltage generator 20ac and the second control voltage generator 20ad. While the detecting signal DTC is staying the low level, the switching circuit 20ab maintains a first enable signal EBL3 and a second enable signal EBL4 at active high level and inactive low level, respectively, and the first enable signal EBL3 and the second enable signal EBL4 are supplied to the first control voltage generator 20ac and the second control voltage generator 20ad, respectively. The first control voltage generator 20ac is enabled with the first enable signal EBL3, and produces the control voltage VrefB from the control voltage Vcnt. On the other hand, when the detecting signal DTC is changed to the high level, the switching circuit 20ab changes the first enable signal EBL3 and the second enable signal EBL4 to the inactive level and the active level, respectively, and the second control signal generator 20ad produces the control voltage DTYB from the control voltage Vcnt. The control voltages VrefB and DTYB are varied together with the control voltage Vcnt as shown in FIG. 11. The control voltage Vcnt is continuously varied between zero percent to 100 percent. Zero percent and 100 percent mean the lowest luminous intensity and the highest luminous intensity, respectively.

Figure 14:
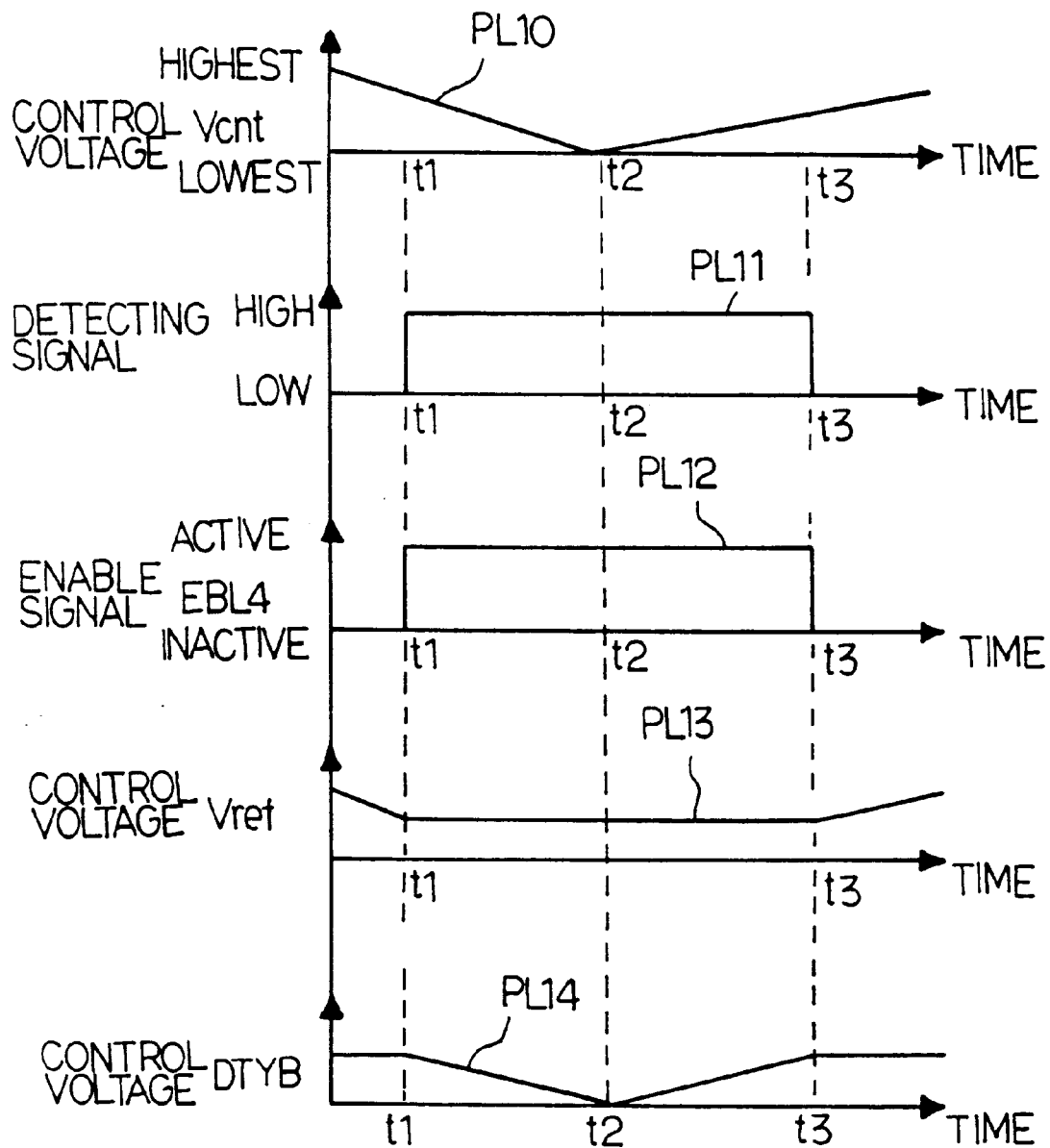
FIG. 14 is a timing chart showing the behavior of the luminous intensity regulator.

The luminous intensity regulator 20a behaves as follows. While the user is decreasing the control voltage Vcnt from the highest luminous intensity toward the lowest luminous intensity as indicated by plots PL10 in FIG. 14, the load current CR2 has the waveform shown in FIG. 5A until the oscillation, and the waveform discriminator 20aa keeps the detecting signal DTC low (see plots PL11). In this situation, the switching circuit 20ab activates the first control voltage generator 20ac with the third enable signal EBL3 of the active level, and deactivates the second control voltage generator 20ad with the enable signal EBL4 of the inactive level (see plots PL12). The first control voltage generator 20ac is responsive to the control voltage Vcnt for decreasing the control voltage VrefB (see plots PL13), and the second control voltage generator 20ad maintains the control voltage DTYB constant (see plots PL14). Thus, the light controller 20 controls the cold cathode tube 10 through the variable frequency control technology until the oscillation.

Figure 15A:
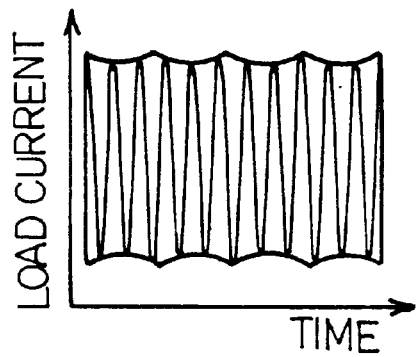
FIGS. 15A and 15B are views showing waveforms of oscillating load current.

If the load current CR2 starts to oscillate at time t1 as shown in FIG. 15A, the waveform discriminator 20aa changes the detecting signal DTC to the high level (see plots PL11), and the switching circuit 20ab inverts the enable signals EBL3 and EBL4. Then, the first control voltage generator 20ac keeps the control voltage VrefB constant (see plots PL13), and the second control voltage generator 20ad starts to decrease the control voltage DTYB (see plots PL14). The control voltage Vcnt reaches the lowest value at time t2, and, accordingly, the control voltage DTYB minimizes the value. Thus, the light controller 20 controls the cold cathode tube 10 through the variable duty-factor control technology.

Figure 15B:
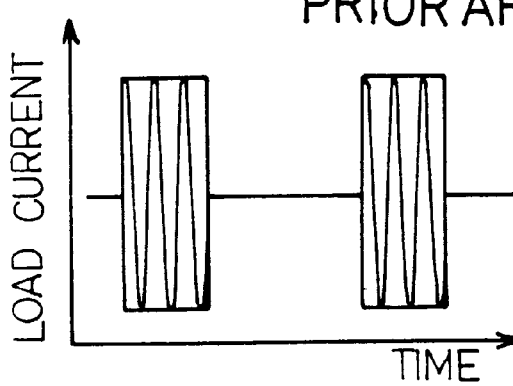

The user is assumed to increase the control voltage Vcnt from time t2 (see plots PL10). The load current has a waveform shown in FIG. 15B, and the waveform discriminator 20aa keeps the detecting signal high (see plots PL11). The second control voltage generator 20ad causes the driving circuit 12i to increase the duty factor of the driving signal DR, and the load current CR2 returns to the waveform shown in FIG. 5A at time t3. Then, the waveform discriminator 20aa changes the detecting signal DTC to the low level, and the switching circuit 20ab inverts the enable signals EBL3 and EBL4, again. Then, the first control voltage generator 20ac is activated so as to increase the control voltage VrefB together with the control voltage Vcnt as indicated by plots PL13. On the other hand, the second control voltage generator 20ad keeps the control voltage constant as indicated by plots PL14. Thus, the light controller 20 changes the control mode from the variable duty factor control mode to the variable frequency control mode.

As will be appreciated from the foregoing description, the waveform discriminator 20aa discriminates the oscillating waveform, and automatically changes the control mode between the variable frequency control mode and the variable duty factor control mode. The light controller 20 achieves all the advantages of the first embodiment. Moreover, the light controller 20 appropriately controls the cold cathode tube 10 regardless the individuality.

Figure 16:
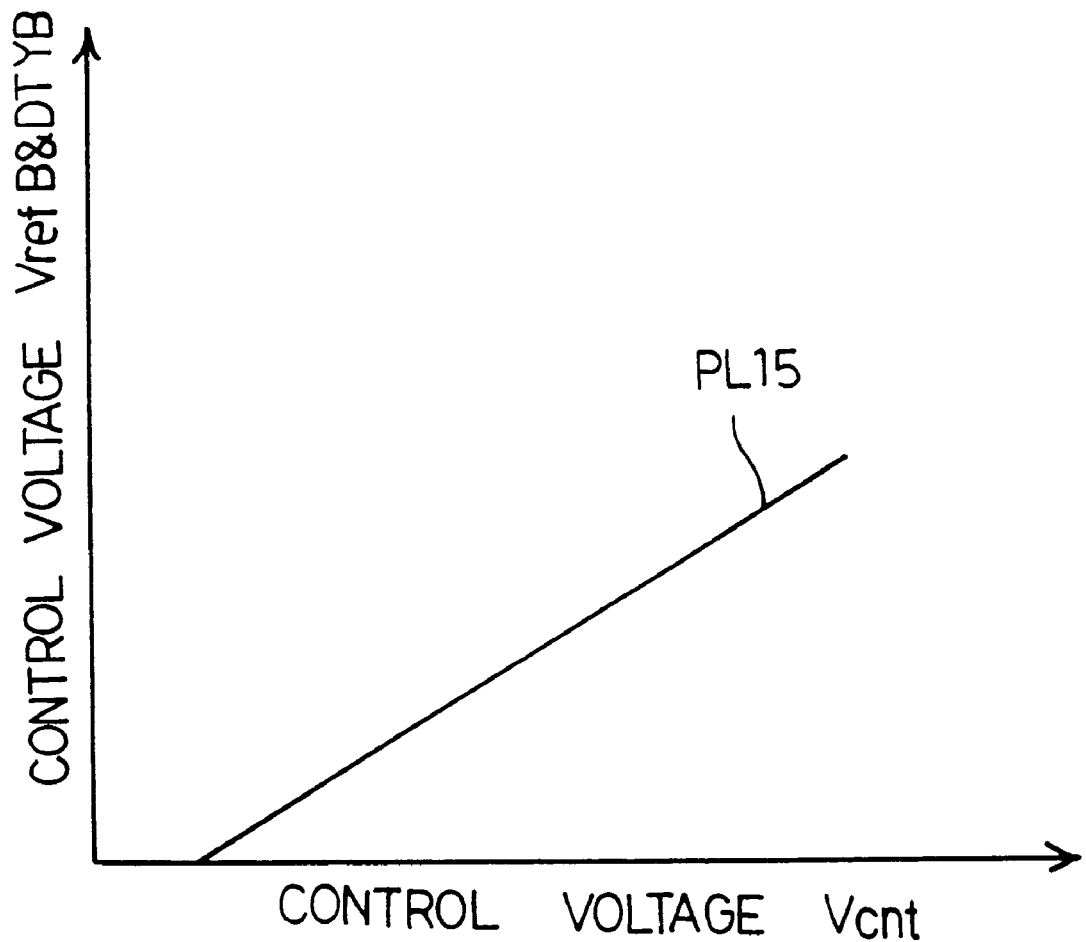
FIG. 16 is a diagram showing relation between a control voltage representative of a target luminous intensity and a composite control voltage between a control voltage representative of a target frequency and a control voltage representative of a target duty factor.

The light controllers 12/20 control the cold cathode tube 10 through the appropriate control mode, and a composite control voltage VrefB/DTYB is varied as indicated by plots PL15 shown in FIG. 16. By virtue of the composite control voltage PL15, the light controllers 12/20 achieves the following advantages.

First, the cold cathode tube 10 does not abruptly change the luminous intensity, because the light controllers 12/20 prevent the load current CR2 from undesirable oscillation through the variable duty factor control technology.

Second, the cold cathode tube 10 is prevented from the luminous gradient, because the light controllers 12/20 maintain the impedance of the cold cathode tube 10 through the variable duty factor control technology.

Third, the power supply unit for the driving circuit 12i is easily designed, because the light controllers 12/20 control the heavy load through the variable frequency control technology without intermittent power-on/power-off control.

Fourth, the audible noise is drastically reduced, because the intermittent power-on/power-off control is limited to the small luminous intensity range.

Finally, the light controllers 12/20 are appropriate for integration on a semiconductor chip, because the control mode is automatically changed.

Although particular embodiments of the present invention have been shown and described, it will be obvious to those skilled in the art that various changes and modifications may be made without departing from the spirit and scope of the present invention.

For example, the light controller according to the present invention may control another kind of light source in so far as the light source has problems in different luminous intensity ranges.

What is claimed is:

1. A light controller connected to a piezoelectric transformer for controlling a light source, comprising:
    an instruction means for producing a first control signal representative of a target luminous intensity of said light source;
    a first light intensity controlling means supplying a variable frequency driving signal to said piezoelectric transformer for adjusting said light source to said target luminous intensity;
    a second light intensity controlling means supplying a variable duty factor driving signal to said piezoelectric transformer for adjusting said light source to said target luminous intensity; and
    a change-over means responsive to said first control signal and to a range-defining signal representing one of a first luminous intensity range and a second luminous intensity range for selectively activating said first light intensity controlling means and said second light intensity controlling means, wherein
    luminous intensity in said first luminous intensity range is deteriorated if controlled by said second light intensity controlling means, and wherein luminous intensity in said second luminous intensity range is deteriorated if controlled by said first light intensity controlling means.

2. The light controller as set forth in claim 1, in which said light source is a cold cathode tube, and said first luminous intensity range is higher than said second luminous intensity range.

3. A light controller connected to a piezoelectric transformer for controlling a light source, comprising:
    an instruction means for producing a first control signal representative of a target luminous intensity of said light source;
    a first light intensity controlling means supplying a variable frequency driving signal to said piezoelectric transformer for adjusting said light source to said target luminous intensity;
    a second light intensity controlling means supplying a variable duty factor driving signal to said piezoelectric transformer for adjusting said light source to said target luminous intensity; and
    a change-over means responsive to said first control signal and to a range-defining signal representing one of a first luminous intensity range and a second luminous intensity range for selectively activating said first light intensity controlling means and said second light intensity controlling means, wherein
    luminous intensity in said first luminous intensity range is deteriorated if controlled by said second light intensity controlling means, and wherein luminous intensity in said second luminous intensity range is deteriorated if controlled by said first light intensity controlling means, and further wherein
    said change-over means includes a reference voltage source for producing said range-defining signal as a constant boundary voltage representative of a boundary luminous intensity between said first luminous intensity range and said second luminous intensity range, and
    a luminous intensity regulator comparing a target luminous intensity represented by said first control signal with said boundary luminous intensity so as to supply a second control signal and a third control signal selectively varied together with said first control signal to said first luminous intensity controlling means and said second luminous intensity controlling means, respectively.

4. The light controller as set forth in claim 3, in which said second control signal is fixed to a certain potential level during variation of said third control signal together with said first control signal, and said third control signal is fixed to a certain potential level during variation of said second control signal together with said first control signal.

5. The light controller as set forth in claim 3, in which said luminous intensity regulator includes
    a comparator comparing said target luminous intensity with said boundary luminous intensity for producing a fourth control signal changed between a first level and a second level,
    a constant voltage source for producing a constant potential level,
    a first switching unit connected to said constant voltage source and said instruction means and operative to change said second control signal together with said first control signal in response to said fourth control signal of said first level and keep said second control signal at said constant potential level in response to said fourth control signal of said second level, and
    a second switching unit connected to said constant voltage source and said instruction means and operative to change said third control signal together with said first control signal in response to said fourth control signal of said second level and keep said third control signal at said constant potential level in response to said fourth control signal of said first level.

6. The light controller as set forth in claim 5, in which said light source is a cold cathode tube, and said first luminous intensity range is higher than said second luminous intensity range.

7. A light controller connected to a piezoelectric transformer for controlling a light source, comprising:
    an instruction means for producing a first control signal representative of a target luminous intensity of said light source;
    a first light intensity controlling means for supplying a variable frequency driving signal to said piezoelectric transformer for adjusting said light source to said target luminous intensity;
    a second light intensity controlling means supplying a variable duty factor driving signal to said piezoelectric transformer for adjusting said light source to said target luminous intensity; and
    a change-over means responsive to said first control signal and to a range-defining signal representing one of a first luminous intensity range and a second luminous intensity range for selectively activating said first light intensity controlling means and said second light intensity controlling means, wherein
    luminous intensity in said first luminous intensity range is deteriorated if controlled by said second light intensity controlling means, and wherein luminous intensity in said second luminous intensity range is deteriorated if controlled by said first light intensity controlling means, and further wherein said change-over means includes a waveform discriminator supplied with said range-defining signal, wherein said range-defining signal is a load current flowing through said light source, and wherein said waveform discriminator checks said load current to see whether or not the waveform of said load current is indicative of oscillation and produces a second control signal representative of either oscillating state or non-oscillating state, a switching circuit responsive to said second control signal so as to change a third control signal between an active level and an inactive level and a fourth control signal between an inactive level and an active level complementarily to said third control signal, a first control voltage generator operative to supply a fifth control signal variable together with said first control signal in response to said third control signal of said active level and maintained at a constant potential level in response to said third control signal of said inactive level to said first luminous intensity controlling means, and a second control voltage generator operative to supply a sixth control signal variable together with said first control signal in response to said fourth control signal of said active level and maintained at a constant potential level in response to said fourth control signal of said inactive level to said second luminous intensity controlling means.

8. The light controller as set forth in claim 7, in which said light source is a cold cathode tube, and said first luminous intensity range is higher than said second luminous intensity range.

9. A light controller connected to a piezoelectric transformer for controlling a light source, comprising:

an instruction circuit for producing a first control signal representative of a target luminous intensity of said light source;

first light intensity controlling circuit supplying a variable frequency driving signal to said piezoelectric transformer for adjusting said light source to said target luminous intensity;

a second light intensity controlling circuit supplying a variable duty factor driving signal to said piezoelectric transformer for adjusting said light source to said target luminous intensity; and a change-over circuit responsive to said first control signal and to a range-defining signal representing one of a first luminous intensity range and a second luminous intensity range for selectively activating said first light intensity controlling circuit and said second light intensity controlling circuit, wherein luminous intensity in said first luminous intensity range is deteriorated if controlled by said second light intensity controlling circuit, and wherein luminous intensity in said second luminous intensity range is deteriorated if controlled by said first light intensity controlling circuit.

10. The light controller as set forth in claim 9, in which said light source is a cold cathode tube, and said first luminous intensity range is higher than said second luminous intensity range.

11. A light controller connected to a piezoelectric transformer for controlling a light source, comprising:

an instruction circuit for producing a first control signal representative of a target luminous intensity of said light source;

a first light intensity controlling circuit supplying a variable frequency driving signal to said piezoelectric transformer for adjusting said light source to said target luminous intensity;

a second light intensity controlling circuit supplying a variable duty factor driving signal to said piezoelectric transformer for adjusting said light source to said target luminous intensity; and a change-over circuit responsive to said first control signal and to a range-defining signal representing one of a first luminous intensity range and a second luminous intensity range for selectively activating said first light intensity controlling circuit and said second light intensity controlling circuit, wherein luminous intensity in said first luminous intensity range is deteriorated if controlled by said second light intensity controlling circuit, and wherein luminous intensity in said second luminous intensity range is deteriorated if controlled by said first light intensity controlling circuit, and further wherein said change-over circuit includes a reference voltage source for producing said range-defining signal as a constant boundary voltage representative of a boundary luminous intensity between said first luminous intensity range and said second luminous intensity range, and a luminous regulator comparing a target luminous intensity represented by said first control signal with said boundary luminous intensity so as to supply a second control signal and a third control signal selectively varied together with said first control signal to said first luminous intensity controlling circuit and said second luminous intensity controlling circuit, respectively.

12. The light controller as set forth in claim 11, in which said second control signal is fixed to a certain potential level during variation of said third control signal together with said first control signal, and said third control signal is fixed to a certain potential level during variation of said second control signal together with said first control signal.

13. The light controller as set forth in claim 11, in which said luminous intensity regulator includes a comparator comparing said target luminous intensity with said boundary luminous intensity for producing a fourth control signal changed between a first level and a second level, a constant voltage source for producing a constant potential level, a first switching unit connected to said constant voltage source and said instruction circuit and operative to change said second control signal together with said first control signal in response to said fourth control signal of said first level and keep said second control signal at said constant potential level in response to said fourth control signal of said second level, and a second switching unit connected to said constant voltage source and said instruction circuit and operative to change said third control signal together with said first control signal in response to said fourth control signal of said second level and keep said third control signal at said constant potential level in response to said fourth control signal of said first level.

14. The light controller as set forth in claim 13, in which said light source is a cold cathode tube, and said first luminous intensity range is higher than said second luminous intensity range.

15. A light controller connected to a piezoelectric transformer for controlling a light source, comprising:
- an instruction circuit for producing a first control signal representative of a target luminous intensity of said light source;
- a first light intensity controlling circuit supplying a variable frequency driving signal to said piezoelectric transformer for adjusting said light source to said target luminous intensity;
- a second light intensity controlling circuit supplying a variable duty factor driving signal to said piezoelectric transformer for adjusting said light source to said target luminous intensity; and
- a change-over circuit responsive to said first control signal and to a range-defining signal representing one of a first luminous intensity range and a second luminous intensity range for selectively activating said first light intensity controlling circuit and said second light intensity controlling circuit, wherein
- luminous intensity in said first luminous intensity range is deteriorated if controlled by said second light intensity controlling circuit, and wherein luminous intensity in said second luminous intensity range is deteriorated if controlled by said first light intensity controlling circuit, and further wherein said change-over circuit includes
- a waveform discriminator supplied with said range-defining signal, wherein said range-defining signal is a load current flowing through said light source, and wherein said waveform discriminator checks said load current to see whether or not the waveform of said load current is indicative of oscillation and produces a second control signal representative of either oscillating state or non-oscillating state,
- a switching circuit responsive to said second control signal so as to change a third control signal between an active level and an inactive level and a fourth control signal between an inactive level and an active level complementarily to said third control signal,
- a first control voltage generator operative to supply a fifth control signal variable together with said first control signal in response to said third control signal of said active level and maintained at a constant potential level in response to said third control signal of said inactive level to said first luminous intensity controlling circuit, and
- a second control voltage generator operative to supply a sixth control signal variable together with said first control signal in response to said fourth control signal of said active level and maintained at a constant potential level in response to said fourth control signal of said inactive level to said second luminous intensity controlling circuit.

16. The light controller as set forth in claim 15, in which said light source is a cold cathode tube, and said first luminous intensity range is higher than said second luminous intensity range, respectively.

* * * * *